United States Patent
Shi et al.

(10) Patent No.: US 12,156,224 B2
(45) Date of Patent: Nov. 26, 2024

(54) APPARATUS AND METHOD OF DETERMINING A TRANSMISSION CONFIGURATION INDICATION

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 490 days.

(21) Appl. No.: 17/399,022

(22) Filed: Aug. 10, 2021

(65) Prior Publication Data
US 2021/0385803 A1 Dec. 9, 2021

Related U.S. Application Data

(63) Continuation of application No. PCT/CN2019/075267, filed on Feb. 15, 2019.

(51) Int. Cl.
| | |
|---|---|
| *H04W 72/04* | (2023.01) |
| *H04L 5/00* | (2006.01) |
| *H04W 48/08* | (2009.01) |
| *H04W 72/23* | (2023.01) |

(52) U.S. Cl.
CPC .......... *H04W 72/23* (2023.01); *H04L 5/0048* (2013.01); *H04W 48/08* (2013.01)

(58) Field of Classification Search
CPC .... H04W 48/08; H04W 72/23; H04L 5/0023; H04L 5/0048; H04L 5/0094; H04B 7/02
See application file for complete search history.

(56) References Cited

U.S. PATENT DOCUMENTS

| | | | | |
|---|---|---|---|---|
| 11,101,949 | B2 * | 8/2021 | Park | H04L 5/0048 |
| 11,569,954 | B2 * | 1/2023 | Zhang | H04L 5/0051 |
| 11,804,943 | B2 * | 10/2023 | Gao | H04L 5/10 |
| 12,015,463 | B2 * | 6/2024 | Song | H04L 5/0023 |
| 2019/0261329 | A1 * | 8/2019 | Park | H04L 5/0048 |
| 2019/0296876 | A1 * | 9/2019 | Zhang | H04L 5/0048 |
| 2019/0379431 | A1 * | 12/2019 | Park | H04B 7/0408 |
| 2020/0244320 | A1 * | 7/2020 | Wang | H04B 7/0626 |

(Continued)

OTHER PUBLICATIONS

International Search Report issued in corresponding International Application No. PCT/CN2019/075267, mailed Nov. 7, 2019, 31 pages.

(Continued)

*Primary Examiner* — Liton Miah
(74) *Attorney, Agent, or Firm* — BAYES PLLC

(57) ABSTRACT

A user equipment (UE) of and a method for determining a transmission configuration indication (TCI) is provided. The UE includes a memory, a transceiver and a processor coupled to the memory and the transceiver. The processor is configured to control the transceiver to receive downlink control information (DCI) from a network node, and determine a corresponding TCI state according to an indication of the DCI or an indication of a medium access control (MAC) control element (CE).

19 Claims, 2 Drawing Sheets

200

202 — Receiving a downlink control information (DCI) from a network node

204 — Determining a corresponding TCI state according to an indication of the DCI or an indication of a medium access control (MAC) control element (CE)

(56) References Cited

U.S. PATENT DOCUMENTS

2020/0337058 A1\* 10/2020 Song .................... H04W 72/53
2022/0077982 A1\* 3/2022 Zhang .................. H04L 5/0014
2022/0191892 A1\* 6/2022 Muruganathan ...... H04W 72/23

OTHER PUBLICATIONS

PCT Written Opinion of the International Searching Authority issued in corresponding International Application No. PCT/CN2019/075267, mailed Nov. 7, 2019, 4 pages.
"3rd Generation Partnership Project; Technical Specification Group Radio Access Network; NR; Multiplexing and channel coding (Release 16)", 3GPP TS 38.212 V16.0.0 (Dec. 2019), 141 pages.
"Remaining Details on QCL", Agenda item: 7.2.3.7, Source: Qualcomm Incorporated, 3GPP TSG AN WG1 Meeting #92, R1-1802832, Athens, Greece, Feb. 26-Mar. 2, 2018, 12 pages.
"3rd Generation Partnership Project; Technical Specification Group Radio Access Network; NR; Physical layer procedures for data (Release 16)", 3GPP TS 38.214 V16.0.0 (Dec. 2019), 147 pages.
"Details and evaluation results on beam indication", Agenda Item: 7.2.2.6, Source: ZTE, Sanechips, 3GPP TSG RAN WG1 Meeting #91, R1-1719538, Reno, USA, Nov. 27-Dec. 1, 2017, 11 pages.
"3rd Generation Partnership Project; Technical Specification Group Radio Access Network; NR; Radio Resource Control (RRC) protocol specification (Release 15)", 3GPP TS 38.331 V15.8.0 (Dec. 2019), 529 pages.
"Discussion on Enhancements on Multi-Beam Operation", Agenda Item: 7.2.8.3, Source: vivo, 3GPP TSG RAN WG1 Meeting #95, R1-1812324, Spokane, USA, Nov. 12-16, 2018, 10 pages.
Extended European Search Report issued in corresponding European Application No. 19915307.3, mailed Jan. 5, 2022, 10 pages.
"Summary of AI: 7.2.8.2 Enhancements on Multi-TRP/Panel Transmission of Offline Discussion", Agenda Item: 7.2.8.2, Source: Huawei, HiSilicon, 3GPP TSG RAN WGI Ad-Hoc Meeting 1901, RI-1901371, Taipei, Jan. 21-25, 2019, 39 pages.
"Enhancements on multi-TRP/Panel transmission", Agenda: 7.2.8.2, Source: ZTE, 3GPP TSG RAN WG1 Ad-Hoc Meeting 1901, R1-1900087, Taipei, Jan. 21-25, 2019, 16 pages.

\* cited by examiner

APPARATUS AND METHOD OF DETERMINING A TRANSMISSION CONFIGURATION INDICATION

CROSS-REFERENCE TO RELATED APPLICATION

This application is a continuation of International Application No. PCT/CN2019/075267, filed on Feb. 15, 2019, the entire contents of which are incorporated herein by reference.

BACKGROUND

The present disclosure relates to the field of communication systems, and more particularly, to an apparatus and a method of determining a transmission configuration indication (TCI).

In current protocols and/or configurations, there is no specific method for which DMRS ports correspond to which TCI state, because scenarios of simultaneous transmission from multiple transmission/reception points (TRPs), panels, and/or beams are not considered.

Therefore, there is a need for an apparatus and a method of determining a transmission configuration indication (TCI).

SUMMARY

An object of the present disclosure is to propose an apparatus and a method of determining a transmission configuration indication (TCI) capable of providing a good signaling flexibility, a fast configuration, a good communication performance, and/or high reliability for a user equipment (UE).

In a first aspect of the present disclosure, a user equipment of determining a transmission configuration indication (TCI) includes a memory, a transceiver, and a processor coupled to the memory and the transceiver. The processor is configured to control the transceiver to receive a downlink control information (DCI) from a network node, and determine a corresponding TCI state according to an indication of the DCI or an indication of a medium access control (MAC) control element (CE).

In a second aspect of the present disclosure, a method for determining a transmission configuration indication (TCI) of a user equipment includes receiving a downlink control information (DCI) from a network node, and determining a corresponding TCI state according to an indication of the DCI or an indication of a medium access control (MAC) control element (CE).

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1:
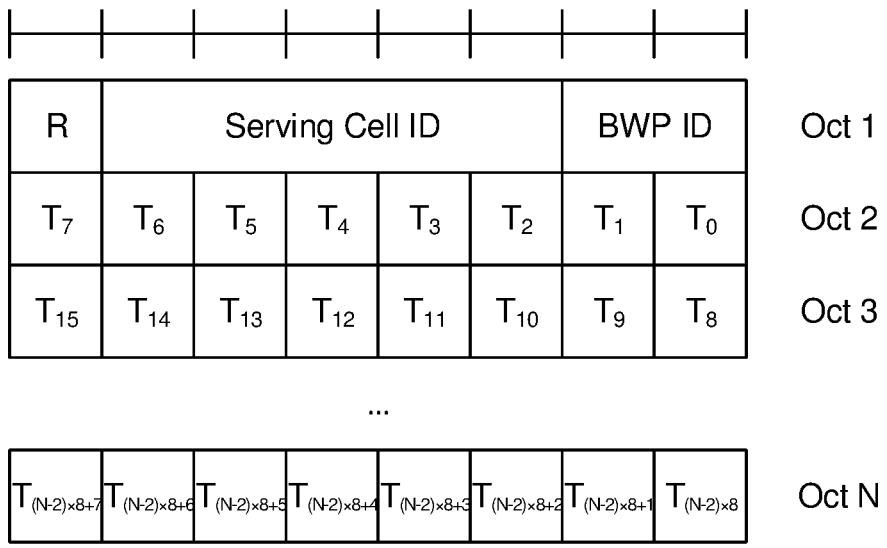
FIG. 1 is a diagram of transmission configuration indication (TCI) states activation/deactivation for user equipment (UE)-specific physical downlink shared channel (PDSCH) medium access control (MAC) control element (CE) according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In current new radio (NR)/5G discussions, multiple transmission/reception points (TRPs), antenna panels, and/or beams simultaneously transmitting to a UE support following schemes. 1. Alt1. The UE detects only one NR physical downlink control channel (PDCCH), and a downlink control information (DCI) obtained by the control channel indicates related information of data simultaneously transmitted on multiple TRPs, panels, and/or beams. 2. Alt2. The UE receives different NR-PDCCHs from different TRPs, panels, and/or beams, and the detected DCI on each control channel indicates corresponding indication information of a corresponding data transmission. For a first scheme (Alt1), the UE only needs to detect one NR-PDCCH, such that a control channel detection complexity may be lower than a second scheme (Alt2). The first scheme (Alt1) requires fast interaction between different panels, TRPs, and/or beams. For the second scheme (Alt2), the UE needs to simultaneously detect multiple NR-PDCCHs on the same carrier, and complexity needs to be increased accordingly. Some embodiments of the present disclosure are directed to the first scheme (Alt1), that is, the case where one DCI scheduling data is transmitted from one or more TRPs, panels, and/or beams.

In some embodiments, in a Quasi co-location (QCL) indication for a downlink transmission, when a terminal performs signal reception, in order to improve a reception performance, a reception algorithm may be improved by utilizing characteristics of a transmission environment corresponding to a data transmission. For example, statistical characteristics of a channel can be utilized to optimize designs and parameters of a channel estimator. In a NR system, these characteristics corresponding to data transmission are represented by a QCL state (QCL-Info). If the downlink transmission is from different TRPs, panels, and/or beams, characteristics of a transmission environment corresponding to the data transmission may also change. Therefore, in the NR system, a network node transmits a downlink control channel or a data channel, corresponding QCL state information is indicated via a TCI state to the terminal from the network node.

In the NR system, there are two types of demodulation reference signal (DMRS), type 1 DMRS and type 2 DMRS. In type 1 DMRS, 2 CDM groups are supported. If 1 OFDM symbol is occupied, up to 4 DMRS ports are supported, where ports {0, 1} belong to CDM group 0, and ports {2, 3} belong to CDM group 1. If 2 OFDM symbols are occupied, up to 8 DMRS ports are supported, where ports {0, 1, 4, 5} belong to CDM group 0, and ports {2, 3, 6, 7} belong to CDM group 1. In type 2 DMRS, 3 CDM groups are supported. If 1 OFDM symbol is occupied, up to 6 DMRS ports are supported, where ports {0, 1} belong to CDM group 0, ports {2, 3} belong to CDM group 1, and ports {4, 5} belong to CDM group 2. If 2 OFDM symbols are occupied, up to 12 DMRS ports are supported, where ports {0, 1, 6, 7} belong to CDM group 0, ports {2, 3, 8, 9} belong to CDM group 1, and ports {4, 5, 10, 11} belong to CDM group 2. In some embodiments, each TCI codepoint in a DCI can correspond to 1 or 2 TCI states. When 2 TCI states are activated within a TCI codepoint, each TCI state corresponds to one CDM group, at least for DMRS type 1. FFS design can be for DMRS type 2. FFS design relates to TCI field in DCI, and associated MAC-CE signaling impact.

FIG. 1 illustrates that, in some embodiments, transmission configuration indication (TCI) states activation/deactivation for user equipment (UE)-specific physical downlink shared channel (PDSCH) medium access control (MAC) control element (CE) according to an embodiment of the present disclosure is provided. In some embodiments, the TCI states activation/deactivation for UE-specific PDSCH MAC CE is identified by a MAC PDU subheader with LCID as specified in a table. It has a variable size consisting of following fields. Serving Cell ID: This field indicates the identity of the Serving Cell for which the MAC CE applies. The length of the field is 5 bits. BWP ID: This field indicates a DL BWP for which the MAC CE applies as the codepoint of the DCI bandwidth part indicator field as specified in TS 38.212. The length of the BWP ID field is 2 bits. Ti: If there is a TCI state with TCI-StateId i as specified in TS 38.331, this field indicates the activation/deactivation status of the TCI state with TCI-StateId i, otherwise MAC entity shall ignore the Ti field. The Ti field is set to "1" to indicate that the TCI state with TCI-StateId i shall be activated and mapped to the codepoint of the DCI transmission configuration indication field, as specified in TS 38.214. The Ti field is set to "0" to indicate that the TCI state with TCI-StateId i shall be deactivated and is not mapped to the codepoint of the DCI transmission configuration indication field. The codepoint to which the TCI state is mapped is determined by its ordinal position among all the TCI states with Ti field set to "1", i.e. the first TCI state with Ti field set to "1" shall be mapped to the codepoint value 0, second TCI state with Ti field set to "1" shall be mapped to the codepoint value 1 and so on. The maximum number of activated TCI states is 8. R: Reserved bit, set to "0".

Figure 2:
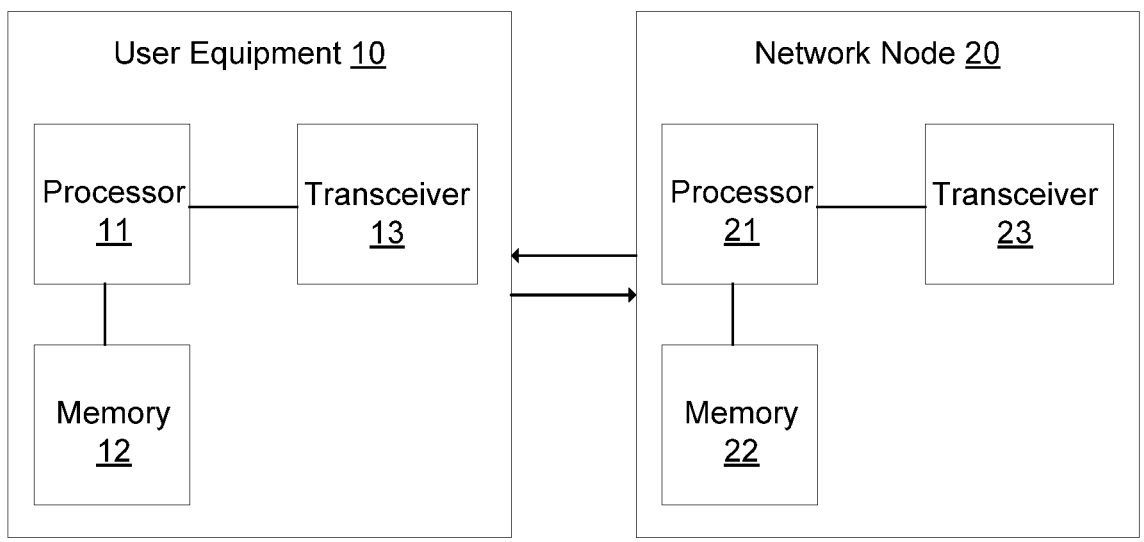
FIG. 2 is a block diagram of a user equipment (UE) and a network node performing a transmission configuration indication (TCI) according to an embodiment of the present disclosure.

FIG. 2 illustrates that, in some embodiments, a user equipment (UE) 10 and a network node 20 performing a transmission configuration indication (TCI) according to an embodiment of the present disclosure are provided. The UE 10 may include a processor 11, a memory 12, and a transceiver 13. The network node 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, and beyond. UEs communicate with each other directly via a sidelink interface such as a PC5 interface. The communication between a UE and a network node is according to 3rd generation partnership project (3GPP) new radio (NR) release 14, 15, and beyond.

In some embodiments, the processor 11 is configured to control the transceiver 13 to receive a downlink control information (DCI) from the network node 20, and determine a corresponding TCI state according to an indication of the DCI or an indication of a medium access control (MAC) control element (CE).

In some embodiments, the corresponding TCI state can be at least one corresponding TCI state. For example, the at least one corresponding TCI state can be two corresponding TCI states. In details, the indication is indicated by a TCI field of the DCI. A length of the TCI field is 3 bits, 4 bits, or a configured bit determined according to a configuration from the network node. In some embodiments, the transceiver 13 receives TCI state configuration information from the network node 20 before receiving the DCI. Further, the TCI state configuration information includes a plurality of TCI states configured by the network node or a plurality of TCI state groups configured by the network node to reduce MAC signaling configuration complexity and reuse current MAC signaling structures. The TCI state configuration information is transmitted by the network node using a radio resource control (RRC) signaling, such as a physical downlink shared channel (PDSCH) configuration to reuse current MAC signaling structures, save time. MAC CE signaling is more flexible and can be configured faster to ensure better performance for mobile UE. A length of the TCI field being 4 bits can increase flexibility, reduce RRC/MAC CE reconfiguration, and support multiple TRPs, panels, and/or beams simultaneous transmissions more effectively. DCI indicates good flexibility of signaling, ensuring good performance for mobile UE.

In some embodiments, each of the TCI state groups indicates 1 to N TCI states. N is equal to 2. N can also be larger than 2 (which is applicable for other embodiments). 1 to N TCI states are configured according to a 3rd generation partnership project (3GPP) new radio (NR) release 15. In some embodiments, the TCI states of one TCI state group share partial configuration information. The TCI states of one TCI state group share an identity (ID) to save signaling overhead. The transceiver 13 is configured to receive configuration information indicating a correspondence between a codepoint of the TCI field and the TCI states or a correspondence between the codepoint of the TCI field and the TCI state groups form the network node 20. The configuration information indicating the correspondence between the codepoint of the TCI field and the TCI states or the correspondence between the codepoint of the TCI field and the TCI state groups is configured by the network node using a medium access control (MAC) control element (CE).

In some embodiments, the processor 11 is configured to indicate the TCI state according to two TCI fields of the DCI. A first TCI field is same as a current TCI field, and a second TCI field exists according to a configuration from the network node. At least one codepoint of a second TCI field is corresponding to not indicating the TCI state. Two TCI fields indicate two TCI states. The processor 13 is configured to determine the corresponding TCI state according to a codepoint value of a TCI field in the DCI. If one corresponding TCI state is determined, all demodulation reference signal (DMRS) ports indicated by the DCI correspond to the one corresponding TCI state. In another embodiment, if two corresponding TCI states are determined and one or more CDM groups correspond to the two TCI states, all DMRS ports indicated by the DCI belonging to the one or more CDM groups correspond to the two corresponding TCI states.

In some embodiments, a correspondence between the one or more CDM groups and the TCI states is indicated by a radio resource control (RRC) signaling or a MAC CE, or is pre-configured. The correspondence between the one or more CDM groups and the TCI states is pre-configured, when the DMRS ports indicated by the DCI belong to two CDM groups, both a type 1 DMRS and a type 2 DMRS are applicable. In another embodiment, the correspondence between the one or more CDM groups and the TCI states is pre-configured, when the DMRS ports indicated by the DCI belong to three CDM groups, a type 2 DMRS is applicable. RRC indicates that unless reconfigured, the correspondence is unchanged, the UE processing complexity is reduced, and it is suitable for stationary or mobile UE. MAC CE signaling is more flexible, and can quickly update correspondences and improve the performance of mobile UE. The correspondence is preconfigured to saving signaling overhead.

In some embodiments, when two transport blocks (TBs) are indicated in the DCI, a correspondence between the one or more CDM groups and the TCI states is indicated by the two TBs. In another embodiment, when the DMRS ports indicated by the DCI belong to the two CDM groups, the correspondence between the one or more CDM groups and the TCI states is determined according to the TCI state IDs. A small CDM group number corresponds to a small TCI state ID, and a large CDM group number corresponds to a large TCI state ID, or the large CDM group number corresponds to the small TCI state ID, and the small CDM group number corresponds to the large TCI state ID. In some embodiments, when the DMRS ports indicated by the DCI belong to the two CDM groups, the correspondence between the one or more CDM groups and the TCI states is determined according to positions of the TCI states in a configuration signaling. A small CDM group number corresponds to a TCI state of a front position, and a large CDM group number corresponds to a TCI state of a back position, or the large CDM group number corresponds to the TCI state of the front position, and the small CDM group number corresponds to the TCI state of the back position.

In some embodiments, the processor 11 is configured to determine the correspondence between the one or more CDM groups and the TCI states according to an indication from the network node. The indication from the network node determines whether to use the small CDM group number corresponding to the small TCI state ID, and the large CDM group number corresponding to the large TCI state ID, or the large CDM group number corresponding to the small TCI state ID, and the small CDM group number corresponding to the large TCI state ID. When a default is the small CDM group number corresponding to the small TCI state ID, and the large CDM group number corresponding to the large TCI state ID, the indication from the network node determines to use the large CDM group number corresponding to the small TCI state ID, and the small CDM group number corresponding to the large TCI state ID. When a default is the large CDM group number corresponding to the small TCI state ID, and the small CDM group number corresponding to the large TCI state ID, the indication from the network node determines to use the small CDM group number corresponding to the small TCI state ID, and the large CDM group number corresponding to the large TCI state ID. Good flexibility with a small amount of indications or configuration information is provided. No indication is required by default, which can reduce overhead.

In some embodiments, the indication from the network node determines whether to use the small CDM group number corresponding to the TCI state of the front position, and the large CDM group number corresponding to the TCI state of the back position, or the large CDM group number corresponding to the TCI state of the front position, and the small CDM group number corresponding to the TCI state of the back position. When a default is the small CDM group number corresponding to the TCI state of the front position, and the large CDM group number corresponding to the TCI state of the back position, the indication from the network node determines to use the large CDM group number corresponding to the TCI state of the front position, and the small CDM group number corresponding to the TCI state of the back position. When a default is the large CDM group number corresponding to the TCI state of the front position, and the small CDM group number corresponding to the TCI state of the back position, the indication from the network node determines to use the small CDM group number corresponding to the TCI state of the front position, and the large CDM group number corresponding to the TCI state of the back position. The indication from the network node is an RRC signaling, a MAC CE, or the DCI.

In some embodiments, when the DMRS ports indicated by the DCI belong to the three CDM groups, a CDM group 0 and a CDM group 1 correspond to the same TCI state, the CDM group 0 and a CDM group 2 correspond to the same TCI state, or the CDM group 1 and the CDM group 2 correspond to the same TCI state. When the CDM group 0 and the CDM group 1 correspond to the same TCI state, a CDM group A is selected from the CDM group 0 and the CDM group 1, where A=min (0, 1) or A=max (0, 1). A correspondence of the CDM group A and the CDM group 2 with the TCI states are determined. In another embodiment, when the CDM group 0 and the CDM group 2 correspond to the same TCI state, a CDM group A is selected from the CDM group 0 and the CDM group 2, where A=min (0, 2) or A=max (0, 2). A correspondence of the CDM group A and the CDM group 1 with the TCI states are determined. In still another embodiment, when the CDM group 1 and the CDM group 2 correspond to the same TCI state, a CDM group A is selected from the CDM group 1 and the CDM group 2, where A=min (1, 2) or A=max (1, 2). A correspondence of the CDM group A and the CDM group 0 with the TCI states are determined.

In some embodiments, the indication from the network node determines whether to use the CDM group 0 and the CDM group 1 corresponding to the same TCI state, the CDM group 0 and the CDM group 2 corresponding to the same TCI state, or the CDM group 1 and the CDM group 2 corresponding to the same TCI state. In another embodiment, when a default is one of the CDM group 0 and the CDM group 1 corresponding to the same TCI state, the CDM group 0 and the CDM group 2 corresponding to the same TCI state, and the CDM group 1 and the CDM group 2 corresponding to the same TCI state, the indication from the network node determines to use another one of the CDM group 0 and the CDM group 1 corresponding to the same TCI state, the CDM group 0 and the CDM group 2 corresponding to the same TCI state, and the CDM group 1 and the CDM group 2 corresponding to the same TCI state.

In details, in a feature a, when the DMRS ports indicated by the DCI belong to 3 CDM groups, the CDM group 0 and the CDM group 1 correspond to the same TCI state. Select the CDM group A from CDM group 0 and CDM group 1. A=min (0, 1) or A=max (0, 1). The CDM group A and the CDM group 2 determine the correspondence with TCI state according to the above method. In details, in a feature b, when the DMRS ports indicated by the DCI belong to 3 CDM groups, the CDM group 0 and the CDM group 2 correspond to the same TCI state. Select the CDM group A from CDM group 0 and CDM group 2. A=min (0, 2) or A=max (0, 2). The CDM group A and the CDM group 1 determine the correspondence with TCI state according to the above method. In details, in a feature c, when the DMRS ports indicated by the DCI belong to 3 CDM groups, the CDM group 1 and the CDM group 2 correspond to the same TCI state. Select the CDM group A from CDM group 1 and CDM group 2. A=min (1, 2) or A=max (1, 2). The CDM group A and the CDM group 0 determine the correspondence with TCI state according to the above method. In details, in a feature d, when the DMRS ports indicated by the DCI belong to 3 CDM groups, the UE receives the network indication, determines one of the correspondences in features a and b above, one of the correspondences in features a and c, one of the correspondences in features b and c, or one of the correspondences in features a, b, and c. Benefit effects are that a small amount of indication or configuration information can be used for better flexibility. Let's determine one of the correspondences in features a and b as an example. The above network indication determines whether to use the corresponding relationship in the feature a or the corresponding relationship in the feature b. The default is the corresponding relationship in the feature a. When the indication is received, the corresponding relationship in the feature b is used (that is, the corresponding one is reversed). Benefit effects are that no need to indicate information by default, this can reduce overhead. The above indication can be RRC, MAC CE, or DCI.

In some embodiments, the two TBs are indicated in the DCI, if a TB 0 corresponds to one or more DMRS port groups, and the TB 0 corresponds to a TCI state X, then the one or more DMRS port groups correspond to the TCI state X. A correspondence between the two TBs and the TCI states is indicated by an RRC signaling or a MAC CE, or is pre-configured. In some embodiments, a correspondence between the two TBs and the TCI states is determined according to the TCI state IDs. The TB 0 having a small TB number corresponds to a small TCI state ID, and a TB 1 having a large TB number corresponds to a large TCI state ID, or the TB1 corresponds to the small TCI state ID, and the TB0 corresponds to the large TCI state ID. In some embodiments, a correspondence between the two TBs and the TCI states is determined according to positions of the TCI states in a configuration signaling. The TB 0 having a small TB number corresponds to a TCI state of a front position, and a TB 1 having a large TB number corresponds to a TCI state of a back position, or the TB1 corresponds to the TCI state of the front position, and the TB0 corresponds to the TCI state of the back position.

In some embodiments, the processor 11 is configured to determine the correspondence between the two TBs and the TCI states according to an indication from the network node 20. The indication from the network node determines whether to use the small TB number corresponding to the small TCI state ID, and the large TB number corresponding to the large TCI state ID, or the large TB number corresponding to the small TCI state ID, and the small TB number corresponding to the large TCI state ID. When a default is the small TB number corresponding to the small TCI state ID, and the large TB number corresponding to the large TCI state ID, the indication from the network node determines to use the large TB number corresponding to the small TCI state ID, and the small TB number corresponding to the large TCI state ID. When a default is the large TB number corresponding to the small TCI state ID, and the small TB number corresponding to the large TCI state ID, the indication from the network node determines to use the small TB number corresponding to the small TCI state ID, and the large TB number corresponding to the large TCI state ID.

In some embodiments, the indication from the network node determines whether to use the small TB number corresponding to the TCI state of the front position, and the large TB number corresponding to the TCI state of the back position, or the large TB number corresponding to the TCI state of the front position, and the small TB number corresponding to the TCI state of the back position. When a default is the small TB number corresponding to the TCI state of the front position, and the large TB number corresponding to the TCI state of the back position, the indication from the network node determines to use the large TB number corresponding to the TCI state of the front position, and the small TB number corresponding to the TCI state of the back position. When a default is the large TB number corresponding to the TCI state of the front position, and the small TB number corresponding to the TCI state of the back position, the indication from the network node determines to use the small TB number corresponding to the TCI state of the front position, and the large TB number corresponding to the TCI state of the back position. The indication from the network node is an RRC signaling, a MAC CE, or the DCI.

Figure 3:
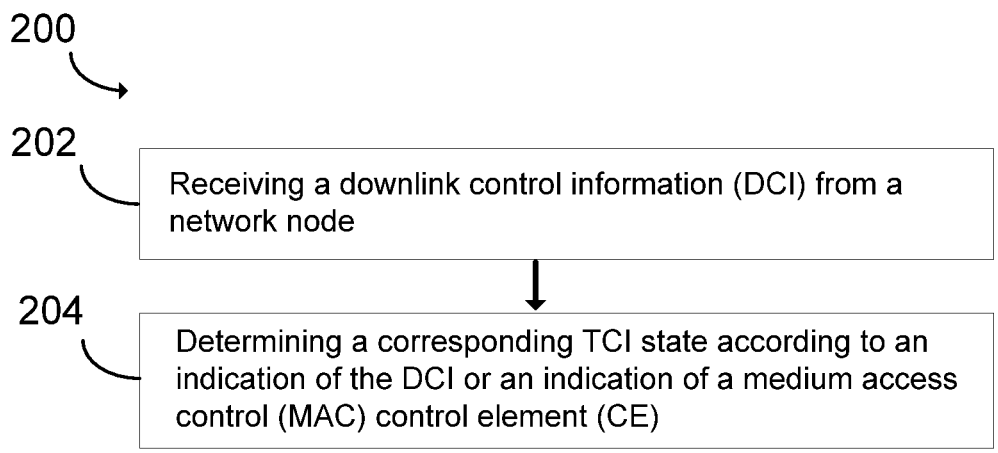
FIG. 3 is a flowchart illustrating a method for determining a transmission configuration indication (TCI) of a user equipment according to an embodiment of the present disclosure.

FIG. 3 illustrates a method 200 for determining a transmission configuration indication (TCI) of a user equipment. The method 200 includes at block 202, receiving a downlink control information (DCI) from a network node, and at block 204, determining a corresponding TCI state according to an indication of the DCI or an indication of a medium access control (MAC) control element (CE).

In some embodiments, the corresponding TCI state can be at least one corresponding TCI state. For example, the at least one corresponding TCI state can be two corresponding TCI states. In details, the indication is indicated by a TCI field of the DCI. A length of the TCI field is 3 bits, 4 bits, or a configured bit determined according to a configuration from the network node. In some embodiments, the method 200 further includes receiving TCI state configuration information from the network node before receiving the DCI. Further, the TCI state configuration information includes a plurality of TCI states configured by the network node or a plurality of TCI state groups configured by the network node to reduce MAC signaling configuration complexity and reuse current MAC signaling structures. The TCI state configuration information is transmitted by the network node using a radio resource control (RRC) signaling, such as a physical downlink shared channel (PDSCH) configuration to reuse current MAC signaling structures, save time. MAC CE signaling is more flexible and can be configured faster to ensure better performance for mobile UE. A length of the TCI field being 4 bits can increase flexibility, reduce RRC/MAC CE reconfiguration, and support multiple TRPs, panels, and/or beams simultaneous transmissions more effectively. DCI indicates good flexibility of signaling, ensuring good performance for mobile UE.

In some embodiments, each of the TCI state groups indicates 1 to N TCI states. N is equal to 2. N can also be larger than 2 (which is applicable for other embodiments). 1 to N TCI states are configured according to a 3rd generation partnership project (3GPP) new radio (NR) release 15. In some embodiments, the TCI states of one TCI state group share partial configuration information. The TCI states of one TCI state group share an identity (ID) to save signaling overhead. The method 200 further includes receiving configuration information indicating a correspondence between a codepoint of the TCI field and the TCI states or a correspondence between the codepoint of the TCI field and the TCI state groups form the network node. The configuration information indicating the correspondence between the codepoint of the TCI field and the TCI states or the correspondence between the codepoint of the TCI field and the TCI state groups is configured by the network node using a medium access control (MAC) control element (CE).

In some embodiments, the method 200 further includes indicating the TCI state according to two TCI fields of the DCI. A first TCI field is same as a current TCI field, and a second TCI field exists according to a configuration from the network node. At least one codepoint of a second TCI field is corresponding to not indicating the TCI state. Two TCI fields indicate two TCI states. The method 200 further includes determining the corresponding TCI state according to a codepoint value of a TCI field in the DCI. If one corresponding TCI state is determined, all demodulation reference signal (DMRS) ports indicated by the DCI correspond to the one corresponding TCI state. In another embodiment, if two corresponding TCI states are determined and one or more CDM groups correspond to the two TCI states, all DMRS ports indicated by the DCI belonging to the one or more CDM groups correspond to the two corresponding TCI states.

In some embodiments, a correspondence between the one or more CDM groups and the TCI states is indicated by a radio resource control (RRC) signaling or a MAC CE, or is pre-configured. The correspondence between the one or more CDM groups and the TCI states is pre-configured, when the DMRS ports indicated by the DCI belong to two CDM groups, both a type 1 DMRS and a type 2 DMRS are applicable. In another embodiment, the correspondence between the one or more CDM groups and the TCI states is pre-configured, when the DMRS ports indicated by the DCI belong to three CDM groups, a type 2 DMRS is applicable. RRC indicates that unless reconfigured, the correspondence is unchanged, the UE processing complexity is reduced, and it is suitable for stationary or mobile UE. MAC CE signaling is more flexible, and can quickly update correspondences and improve the performance of mobile UE. The correspondence is preconfigured to saving signaling overhead.

In some embodiments, when two transport blocks (TBs) are indicated in the DCI, a correspondence between the one or more CDM groups and the TCI states is indicated by the two TBs. In another embodiment, when the DMRS ports indicated by the DCI belong to the two CDM groups, the correspondence between the one or more CDM groups and the TCI states is determined according to the TCI state IDs. A small CDM group number corresponds to a small TCI state ID, and a large CDM group number corresponds to a large TCI state ID, or the large CDM group number corresponds to the small TCI state ID, and the small CDM group number corresponds to the large TCI state ID. In some embodiments, when the DMRS ports indicated by the DCI belong to the two CDM groups, the correspondence between the one or more CDM groups and the TCI states is determined according to positions of the TCI states in a configuration signaling. A small CDM group number corresponds to a TCI state of a front position, and a large CDM group number corresponds to a TCI state of a back position, or the large CDM group number corresponds to the TCI state of the front position, and the small CDM group number corresponds to the TCI state of the back position.

In some embodiments, the method 200 further includes determining the correspondence between the one or more CDM groups and the TCI states according to an indication from the network node. The indication from the network node determines whether to use the small CDM group number corresponding to the small TCI state ID, and the large CDM group number corresponding to the large TCI state ID, or the large CDM group number corresponding to the small TCI state ID, and the small CDM group number corresponding to the large TCI state ID. When a default is the small CDM group number corresponding to the small TCI state ID, and the large CDM group number corresponding to the large TCI state ID, the indication from the network node determines to use the large CDM group number corresponding to the small TCI state ID, and the small CDM group number corresponding to the large TCI state ID. When a default is the large CDM group number corresponding to the small TCI state ID, and the small CDM group number corresponding to the large TCI state ID, the indication from the network node determines to use the small CDM group number corresponding to the small TCI state ID, and the large CDM group number corresponding to the large TCI state ID. Good flexibility with a small amount of indications or configuration information is provided. No indication is required by default, which can reduce overhead.

In some embodiments, the indication from the network node determines whether to use the small CDM group number corresponding to the TCI state of the front position, and the large CDM group number corresponding to the TCI state of the back position, or the large CDM group number corresponding to the TCI state of the front position, and the small CDM group number corresponding to the TCI state of the back position. When a default is the small CDM group number corresponding to the TCI state of the front position, and the large CDM group number corresponding to the TCI state of the back position, the indication from the network node determines to use the large CDM group number corresponding to the TCI state of the front position, and the small CDM group number corresponding to the TCI state of the back position. When a default is the large CDM group number corresponding to the TCI state of the front position, and the small CDM group number corresponding to the TCI state of the back position, the indication from the network node determines to use the small CDM group number corresponding to the TCI state of the front position, and the large CDM group number corresponding to the TCI state of the back position. The indication from the network node is an RRC signaling, a MAC CE, or the DCI.

In some embodiments, when the DMRS ports indicated by the DCI belong to the three CDM groups, a CDM group 0 and a CDM group 1 correspond to the same TCI state, the CDM group 0 and a CDM group 2 correspond to the same TCI state, or the CDM group 1 and the CDM group 2 correspond to the same TCI state. When the CDM group 0 and the CDM group 1 correspond to the same TCI state, a CDM group A is selected from the CDM group 0 and the CDM group 1, where A=min (0, 1) or A=max (0, 1). A correspondence of the CDM group A and the CDM group 2 with the TCI states are determined. In another embodiment, when the CDM group 0 and the CDM group 2 correspond to the same TCI state, a CDM group A is selected from the CDM group 0 and the CDM group 2, where A=min (0, 2) or A=max (0, 2). A correspondence of the CDM group A and the CDM group 1 with the TCI states are determined. In still another embodiment, when the CDM group 1 and the CDM group 2 correspond to the same TCI state, a CDM group A is selected from the CDM group 1 and the CDM group 2, where A=min (1, 2) or A=max (1, 2). A correspondence of the CDM group A and the CDM group 0 with the TCI states are determined.

In some embodiments, the indication from the network node determines whether to use the CDM group 0 and the CDM group 1 corresponding to the same TCI state, the CDM group 0 and the CDM group 2 corresponding to the same TCI state, or the CDM group 1 and the CDM group 2 corresponding to the same TCI state. In another embodiment, when a default is one of the CDM group 0 and the CDM group 1 corresponding to the same TCI state, the CDM group 0 and the CDM group 2 corresponding to the same TCI state, and the CDM group 1 and the CDM group 2 corresponding to the same TCI state, the indication from the network node determines to use another one of the CDM group 0 and the CDM group 1 corresponding to the same TCI state, the CDM group 0 and the CDM group 2 corresponding to the same TCI state, and the CDM group 1 and the CDM group 2 corresponding to the same TCI state.

In some embodiments, the two TBs are indicated in the DCI, if a TB 0 corresponds to one or more DMRS port groups, and the TB 0 corresponds to a TCI state X, then the one or more DMRS port groups correspond to the TCI state X. A correspondence between the two TBs and the TCI states is indicated by an RRC signaling or a MAC CE, or is pre-configured. In some embodiments, a correspondence between the two TBs and the TCI states is determined according to the TCI state IDs. The TB 0 having a small TB number corresponds to a small TCI state ID, and a TB 1 having a large TB number corresponds to a large TCI state ID, or the TB1 corresponds to the small TCI state ID, and the TB0 corresponds to the large TCI state ID. In some embodiments, a correspondence between the two TBs and the TCI states is determined according to positions of the TCI states in a configuration signaling. The TB 0 having a small TB number corresponds to a TCI state of a front position, and a TB 1 having a large TB number corresponds to a TCI state of a back position, or the TB1 corresponds to the TCI state of the front position, and the TB0 corresponds to the TCI state of the back position.

In some embodiments, the method 200 further includes determining the correspondence between the two TBs and the TCI states according to an indication from the network node. The indication from the network node determines whether to use the small TB number corresponding to the small TCI state ID, and the large TB number corresponding to the large TCI state ID, or the large TB number corresponding to the small TCI state ID, and the small TB number corresponding to the large TCI state ID. When a default is the small TB number corresponding to the small TCI state ID, and the large TB number corresponding to the large TCI state ID, the indication from the network node determines to use the large TB number corresponding to the small TCI state ID, and the small TB number corresponding to the large TCI state ID. When a default is the large TB number corresponding to the small TCI state ID, and the small TB number corresponding to the large TCI state ID, the indication from the network node determines to use the small TB number corresponding to the small TCI state ID, and the large TB number corresponding to the large TCI state ID.

In some embodiments, the indication from the network node determines whether to use the small TB number corresponding to the TCI state of the front position, and the large TB number corresponding to the TCI state of the back position, or the large TB number corresponding to the TCI state of the front position, and the small TB number corresponding to the TCI state of the back position. When a default is the small TB number corresponding to the TCI state of the front position, and the large TB number corresponding to the TCI state of the back position, the indication from the network node determines to use the large TB number corresponding to the TCI state of the front position, and the small TB number corresponding to the TCI state of the back position. When a default is the large TB number corresponding to the TCI state of the front position, and the small TB number corresponding to the TCI state of the back position, the indication from the network node determines to use the small TB number corresponding to the TCI state of the front position, and the large TB number corresponding to the TCI state of the back position. The indication from the network node is an RRC signaling, a MAC CE, or the DCI.

Embodiment 1 (RRC configures a TCI state group and a current MAC CE structure is modified) is provided. Benefit effects are to reduce a complexity of MAC signaling configuration, reuse a current MAC signaling structure, and reduce UE implementation complexity. The network node configures the UE with N TCI state groups, where N is an integer greater than or equal to 1. The method includes that a maximum value of N has two options. Option 1: The maximum value of N is 128. Option 2: The maximum value of N is 256. The method includes that each TCI state group can include 1, . . . , K−1, or K TCI states. K=2 is a feature. The following examples all take K=2 as an example. This method includes that different configuration methods for TCI state groups are different. Extend the configuration IE of the current TCI state, add an additional 2 fields of QCL-Info type, the first two QCL-Info types of fields correspond to the first TCI state, and the latter two QCL-Info type fields correspond to second TCI state (embodiment 1-1). Introduce a new IE that sets the TCI state configuration or TCI state identification information contained in this TCI state group (embodiment 1-2).

Embodiment 1-1 (TCI state group configuration method 1 and MAC CE): Benefit effects are that directly expand on the IE corresponding to the current TCI state, avoiding other IE changes and corresponding MAC signaling changes, thereby reducing UE processing complexity. The current TCI state configuration is as follows:

```
TCI-State ::=              SEQUENCE {
    tci-StateId                TCI-StateId,
    qcl-Type1                  QCL-Info,
    qcl-Type2                              QCL-Info
OPTIONAL,  -- Need R
    ...
}
QCL-Info ::=               SEQUENCE {
    cell                                   ServCellIndex
OPTIONAL,  -- Need R
    bwp-Id                                 BWP-Id
OPTIONAL, -- Cond CSI-RS-Indicated
    referenceSignal            CHOICE {
        csi-rs                     NZP-CSI-RS-ResourceId,
        ssb                        SSB-Index
    },
    qcl-Type                   ENUMERATED {typeA, typeB,
typeC, typeD},
    ...
}
```

A TCI state configuration that extends based on the current TCI state IE TCI-State is as follows:

```
TCI-State ::=        SEQUENCE
    tci-StateId          TCI-StateId,
    qcl-Type1            QCL-Info,
    qcl-Type2            QCL-Info      OPTIONAL,
-- Need R
    qcl-Type3                          QCL-Info
OPTIONAL,  -- Need R
    qcl-Type4                          QCL-Info
OPTIONAL,  -- Need R
    ...
}
```

One of information configured by the changed IE TCI-State above is called a TCI state group. When the above changed IE TCI-State is configured with only the following two cases, qcl-Type1 and qcl-Type1+qcl-Type2, it is considered that this TCI state group is configured with one TCI state. In some embodiments, when the above changed IE TCI-State is configured with at least one of {qcl-Type1, qcl-Type2} and at least one of {qcl-Type3, qcl-Type4}, the TCI state group is considered that two TCI states are configured. The TCI state corresponding to qcl-Type1 or qcl-Type1+qcl-Type2 is recorded as the first TCI state. The TCI state corresponding to qcl-Type3 or qcl-Type3+qcl-Type4 is recorded as the second TCI state. The correspondence between the TCI state group and the codepoint of the TCI field in the DCI is indicated by the MAC CE. Signaling Ti corresponds to the TCI state group described above (extended TCI state). The maximum number of Ti can be 128. The maximum number of Ti can be 256. The maximum number of Ti is determined according to RRC signaling and can be 128 or 256. If there are 2 TCI states configured in one TCI status group, the maximum number is 256, otherwise 128. The maximum number of Ti-activated TCI state groups can be 8. The maximum number of Ti-activated TCI state groups can be 16. The maximum number of Ti-activated TCI state groups can be determined according to RRC signaling and may be 8 or 16. If there are 2 TCI states configured in one TCI status group, the maximum number is 16, otherwise 8. The explanation of MAC signaling is the same or similar to that of FIG. 1, please refer to the description of FIG. 1, and will not be repeated here.

Embodiment 1-2 (TCI state group configuration method 2): Benefit effects are that introduce new IE design, avoid changing current IE, get more flexible design, and facilitate further expansion in the future. In the current TCI state configuration mode, some examples of a new IE TCI-StateSet are introduced to represent the TCI state group as follows.

One example of a new IE TCI-StateSet:

```
TCI-StateSet ::=          SEQUENCE {
    TCI-StateSetID            Identification value type,
    TCI-StateIdList           A set of TCI-State identifiers (can be
OPTIONAL or OPTIONAL)
}
```

Another example of a new IE TCI-StateSet:

```
TCI-StateSet ::=          SEQUENCE {
    TCI-StateSetID            Identification value type,
    TCI1                      TCI-State,
    TCI2                      TCI-State OPTIONAL,
}
```

The correspondence between the TCI state group and the codepoint of the TCI field in the DCI is indicated by the MAC CE. Signaling Ti corresponds to the TCI state group described above (extended TCI state). The maximum number of Ti can be 128. The maximum number of Ti can be 256. The maximum number of Ti is determined according to RRC signaling and can be 128 or 256. If there are 2 TCI states configured in one TCI status group, the maximum number is 256, otherwise 128. The maximum number of Ti-activated TCI state groups can be 8. The maximum number of Ti-activated TCI state groups can be 16. The maximum number of Ti-activated TCI state groups can be determined according to RRC signaling and may be 8 or 16. If there are 2 TCI states configured in one TCI status group, the maximum number is 16, otherwise 8. Determine the corresponding current TCI state (TCI-State) in Ti in the following illustration, or the new TCI state group (TCI-StateSet) according to RRC configuration signaling. Benefit effects are that no need to change MAC CE design, and MAC CE type processing is reduced. RRC configures specific parameters. If the parameter value is X, then Ti corresponds to the current TCI state (TCI-State). If the parameter value is Y, then Ti corresponds to the new TCI state group (TCI-StateSet). The above X or Y can be the default value when this parameter is not configured. If the TCI-StateSet is configured in the RRC, the Ti corresponds to the new TCI state group (TCI-StateSet). If the TCI state group (TCI-StateSet) is not configured in the RRC, Ti corresponds to the current TCI state (TCI-State). Benefit effects are that compared with the above solution, no special configuration parameters are needed, thereby saving signaling overhead. Determine the corresponding current TCI state (TCI-State) or the new TCI state group (TCI-StateSet) in Ti according to the sub-packet indication corresponding to the MAC CE. Benefit effects are that bring information through MAC CE indication, change configuration faster, and improve performance than RRC configuration. The value of the LCID in the sub-header is provided. The explanation of MAC signaling is the same or similar to that of FIG. 1, please refer to the description of FIG. 1, and will not be repeated here.

Embodiment 2 (RRC configuration TCI State and MAC CE Structure): Benefit effects are that MAC CE signaling is more flexible and can be configured faster to ensure better performance of mobile UE. The network configures N TCI states for the UE, where N is an integer greater than or equal to 1, the maximum value has two options. The maximum value of Option 1: N is 128. The maximum value of Option 2: N is 256. The correspondence between the TCI state group and the codepoint of the TCI field in the DCI is indicated by the MAC CE. The characteristics of MAC CE related design are as follows. Indicates the purpose of MAC CE in the sub-header LCID, which is a value from 33-46. Indication information includes a serving cell ID, and an indication of a bandwidth part ID. The TCI state indicated by the MAC CE corresponds to the N-bit codepoint, such as 3 bits and 4 bits. Determine whether 3 bits or 4 bits is used depending on the configuration. The specific representation of other partial information may be embodied by the following embodiments.

Embodiment 2-1: Features of MAC CE design are provided. The method includes each codepoint corresponding to two TCI state indications (Table 2-1-1, one byte in the table may contain other bits or reserved bits, not shown here). The method includes instructions for TCI state. 7 bits (can have reserved bits) are used. If a codepoint only corresponds to 1 TCI state, 1 bit can be used to indicate whether another indication is invalid (Table 2-1-2). 8 bits are used. If a codepoint only corresponds to 1 TCI state, another indication information can be set to the reserved value (predetermined), and invalidate another indication (Table 2-1-3). The method includes that if the TCI state value configured by the system is small, there is no corresponding codepoint that can be processed in two ways, for example, a reserved value is set, and the corresponding field can be canceled, thereby saving MAC signaling overhead. In this example, it is assumed that there are 8 codepoints, and actually there are other values, for example, 16. In table 2-1-2, there are two bits R0 and R1 whose positions can also be changed. For example, R0 and/or R1 can be located at the last position of a line. If codepoint 0 only corresponds to 1 TCI state, R0 or R1 can be used to indicate whether the second indication can be ignored (ie, Oct i+1).

TABLE 2-1-1

| | |
|---|---|
| Codepoint 0 corresponds to a first TCI state | Oct i |
| Codepoint 0 corresponds to a second TCI state | Oct i + 1 |
| . . . | |
| Codepoint 7 corresponds to the first TCI state | Oct N − 1 |
| Codepoint 7 corresponds to the second TCI state | Oct N |

TABLE 2-1-2

| | | |
|---|---|---|
| R0 | Codepoint 0 corresponds to the first TCI state | Oct i |
| R1 | Codepoint 0 corresponds to the second TCI state | Oct i + 1 |

TABLE 2-1-3

| | |
|---|---|
| Codepoint 0 corresponds to the first TCI state | Oct i |
| Reserved value | Oct i + 1 |
| . . . | |
| Codepoint 7 corresponds to the first TCI state | Oct N − 1 |
| Codepoint 7 corresponds to the second TCI state | Oct N |

Embodiment 2-2: Features of MAC CE design are provided. The method includes different information fields according to a number of TCI states corresponding to a codepoint. The method includes using the bits in the same Oct to indicate the use of several information fields (that is indicating several TCI states). In table 2-2-1, 7 bits are used to indicate a TCI state flag. The method includes using additional bits to indicate the use of several information fields (that is indicating several TCI states) as illustrated in table 2-2-2. There are two bits R0 and R1 in table 2-2-1, the position of which can also be changed, for example R0 and/or R1 can be located at the last position of a line. If R0=X (X=0 in the example), the corresponding codepoint (for example, 0) corresponds to only one TCI state, the next indication is used for the TCI state indication of the next codepoint (for example, 1). If R0=Y (Y=1 in the example), the corresponding codepoint corresponds to 2 TCI states. In table 2-2-2, the additional bits indicate that the codepoint corresponds to several TCI states. For example, the table assumes 8 codepoints, corresponding to the R0 to R7 field, and each field can be 1 bit (Table 2-2-2A) or 2 bit (Table 2-2-2B, Table 2-2-2C). The corresponding TCI states are indicated by different values. Designed for table 2-2-2A, the specific application is illustrated in table 2-2-2A-1. If R0=X (X=0 in the example), the corresponding codepoint (for example, 0) corresponds to only one TCI state, the next indication is used for the TCI state indication of the next codepoint (for example, 1). If R1=Y, R7=Y (Y=1 in the example), the corresponding codepoint corresponds to 2 TCI state indication information. Designed for table 2-2-2B, the specific application is illustrated in table 2-2-2B-1. If R0=X, R6=X (X=1 in the example), the corresponding codepoint (for example, 0) corresponds to only one TCI state, the next indication is used for the TCI state indication of the next codepoint (for example, 1). If R1=Y (Y=2 in the example), the corresponding codepoint corresponds to 2 TCI state indication information. If R7=Z (Z=0 in the example), the corresponding codepoint does not configure the corresponding state indication information. Then the state information part corresponding to R7 can be ignored, or there is no corresponding field (as illustrated in this table).

TABLE 2-2-1

| | | |
|---|---|---|
| R0 = 0 | Codepoint 0 corresponds to a first TCI state | Oct i |
| R1 | Codepoint 1 corresponds to a first TCI state | Oct i + 1 |
| R0 = 1 | Codepoint 0 corresponds to the first TCI state | Oct i |
| R1 | Codepoint 0 corresponds to a second TCI state | Oct i + 1 |

TABLE 2-2-2A

| R0 | R1 | R2 | R3 | R4 | R5 | R6 | R7 |
|---|---|---|---|---|---|---|---|

Codepoint 0 corresponds to a first TCI state
Codepoint 0 corresponds to a second TCI state
...
Codepoint 7 corresponds to the first TCI state
Codepoint 7 corresponds to the second TCI state

TABLE 2-2-2A-1

| R0 = 0 | R1 = 1 | R2 | R3 | R4 | R5 | R6 | R7 = 1 |
|---|---|---|---|---|---|---|---|

Codepoint 0 corresponds to a first TCI state
Codepoint 1 corresponds to the first TCI state
Codepoint 1 corresponds to a second TCI state
...
Codepoint 7 corresponds to the first TCI state
Codepoint 7 corresponds to the second TCI state

TABLE 2-2-2B

| R0 | R0 | R1 | R1 | R2 | R2 | R3 | R3 |
|---|---|---|---|---|---|---|---|
| R4 | R4 | R5 | R5 | R6 | R7 | R7 | R7 = 1 |

| | |
|---|---|
| Codepoint 0 corresponds to a first TCI state | Oct i |
| Codepoint 0 corresponds to a second TCI state | Oct i + 1 |
| ... | Oct N − 1 |
| Codepoint 7 corresponds to the first TCI state | |
| Codepoint 7 corresponds to the second TCI state | Oct N |

TABLE 2-2-2B-1

| R0 = 1 | | R1 = 2 | | R2 | R2 | R3 | R3 |
|---|---|---|---|---|---|---|---|
| R4 | R4 | R5 | R5 | R6 = 1 | | R7 = 0 | |

Codepoint 0 corresponds to a first TCI state
Codepoint 1 corresponds to the first TCI state
Codepoint 1 corresponds to a second TCI state
...
Codepoint 6 corresponds to the first TCI state

TABLE 2-2-2C

| R0 | R1 | R2 | R3 | R4 | R5 | R6 | R7 |
|---|---|---|---|---|---|---|---|
| R0 | R1 | R2 | R3 | R4 | R5 | R6 | R7 |

| | |
|---|---|
| Codepoint 0 corresponds to a first TCI state | Oct i |
| Codepoint 0 corresponds to a second TCI state | Oct i + 1 |
| ... | |
| Codepoint 7 corresponds to the first TCI state | Oct N − 1 |
| Codepoint 7 corresponds to the second TCI state | Oct N |

Embodiment 2-3: Features of MAC CE design are provided. The method includes indication information corresponding to a codepoint and a corresponding indication information G. The method includes before, and/or in the middle, and/or after the indication information corresponding to the codepoint and the indication information G (as illustrated in the table), there may be a partial reserved bit.

As illustrated in table 2-3-1, if G=X (X=1 in the example), the corresponding codepoint X only corresponds to the indication of 1 TCI state (as illustrated in table 2-3-1A). If G=Y (Y=2 in the example), the corresponding codepoint corresponds to 2 TCI state indication information (as illustrated in table 2-3-1). If G=Z (Z=0 in the example), the corresponding codepoint X does not configure the corresponding state indication information. The state information part corresponding to codepoint X can be ignored, or there is no corresponding field (as illustrated in table 2-3-1C).

TABLE 2-3-1

| Codepoint indication: corresponding to codepoint X | Indication information G | Reserved bit |
|---|---|---|
| Codepoint X corresponds to a first TCI state | | |
| Codepoint X corresponds to a second TCI state | | |

TABLE 2-3-1A

| Codepoint indication: corresponding to codepoint X | Indication information G = 1 | Reserved bit |
|---|---|---|
| Codepoint X corresponds to a first TCI state | | |

TABLE 2-3-1B

| Codepoint indication: corresponding to codepoint X | Indication information G = 2 | Reserved bit |
|---|---|---|
| Codepoint X corresponds to a first TCI state | | |
| Codepoint X corresponds to a second TCI state | | |

TABLE 2-3-1C

| Codepoint indication: corresponding to codepoint X | Indication information G = 0 | Reserved bit |
|---|---|---|
| Codepoint X corresponds to a first TCI state | | |
| Codepoint X corresponds to a second TCI state | | |

Embodiment 3: The UE determines a configuration of the TCI states or a TCI state group and their correspondence with the codepoint. When the UE receives the TCI field indication in the DCI, the UE determines the TCI state information corresponding to the current transmission. If the TCI state information corresponds to the two TCI states, it is required to determine which TCI state the DMRS port indicated by the DCI belongs to. Because the ports in one CDM group cannot correspond to two TCI states (denoted as TCI state A and TCI state B), the DMRS ports indicated by the DCI belong to 2 or 3 CDM groups. In this embodiment, two CDM groups are considered, which are respectively recorded as CDM group X and CDM group Y (X<Y). When Type 1 DMRS, X=0, Y=1. Type 2 DMRS, (X, Y) can have the following combinations: (0, 1) (0, 2) (1, 2). If a CDM group corresponds to a TCI state, the DMRS ports belonging to the CDM group correspond to the TCI state. The correspondence between the CDM groups X, Y and the two TCI states is determined according to the TCI state ID size. There are two options. Option 1: The CDM group X corresponds to a smaller TCI state, and the CDM group Y corresponds to a larger ID TCI state. Option 2: The CDM group Y corresponds to a smaller TCI state, and the CDM group X corresponds to a larger ID TCI state. For example, for Type 1 DMRS, if DCI indicates DMRS ports 0 and 2, port 0 belongs to the CDM group 0, and port 2 belongs to the CDM group 1. If option 1 is used, port 0 corresponds to a smaller TCI state, and port 2 corresponds to a smaller TCI state. If option 2 is used, port 1 corresponds to a smaller TCI state, and port 0 corresponds to a smaller ID TCI state. For example, for Type 2 DMRS, if DCI indicates DMRS ports 3, 4, and 5, then port 3 belongs to CDM group 1, ports 4 and 5 belong to CDM group 2. If option 1 is used, port 3 corresponds to a smaller TCI state, and ports 4 and 5 correspond to a smaller ID TCI state. If option 2 is used, ports 4 and 5 correspond to a smaller TCI state, and port 3 corresponds to a smaller ID TCI state.

Embodiment 3-1: Based on the third embodiment, the correspondence between the CDM group X, Y and the two TCI states can be determined by the following options. Network indications use an option 1 or an option 2. In the option 1, when a default relationship is used, if an indication is received, the UE decides whether to use the option 1 or the option 2 according to the indication. In the option 2, when the default relationship is used, if an indication is received, the UE decides whether to use the option 1 or the option 2 according to the indication. In some embodiments, the option 1 is for the default relationship, and the option 2 is used if the indication is received. In the option 2, when the default relationship is used, the option 1 is used if the indication is received. The above indication can be RRC, MAC CE, or DCI.

Embodiment 4: The UE determines the configuration of the TCI state or a TCI state group and their correspondence with the codepoint. When the UE receives the TCI field indication in the DCI, the UE determines the TCI state information corresponding to the current transmission. If the TCI state information corresponds to the two TCI states, it is required to determine which TCI state the DMRS port indicated by the DCI belongs to. Because the ports in one CDM group cannot correspond to two TCI states (denoted as TCI state A and TCI state B), the DMRS ports indicated by the DCI belong to 2 or 3 CDM groups. In this embodiment, two CDM groups are considered, which are respectively recorded as CDM group X and CDM group Y (X<Y). When Type 1 DMRS, X=0, Y=1. Type 2 DMRS, (X, Y) can have the following combinations: (0,1) (0,2) (1,2). If a CDM group corresponds to a TCI state, the DMRS ports belonging to the CDM group correspond to the TCI state. The correspondence between the CDM group X, Y and the two TCI states is determined according to the location of the TCI state in the configuration signaling. There are two options. Option 1: CDM group X corresponds to the TCI state of the front position, and CDM group Y corresponds to the TCI state of the back position. Option 2: CDM group Y corresponds to the TCI state of the front position, and CDM group X corresponds to the TCI state of the back position. The method includes positions of the TCI state in MAC CE signaling. For example, for Type 1 DMRS, if DCI indicates DMRS ports 0 and 2, port 0 belongs to CDM group 0, and port 2 belongs to CDM group 1. If the option 1 is used, port 0 corresponds to the TCI state in the previous position, and port 2 corresponds to the TCI state in the subsequent position. If the option 2 is used, port 1 corresponds to the TCI state of the front position, and port 0 corresponds to the TCI status of the back position. For example, for Type 2 DMRS, if DCI indicates DMRS ports 3, 4, and 5, then port 3 belongs to CDM group 1, ports 4 and 5 belong to CDM group 2. If the option 1 is used, port 3 corresponds to the front TCI state, and ports 4 and 5 correspond to the back TCI state. If the option 2 is used, ports 4 and 5 correspond to the TCI state of the front position, and port 3 corresponds to the TCI state of the back position.

Embodiment 4-1: Based on the fourth embodiment, the correspondence between the CDM group X, Y and the two TCI states can be determined by the following options. Network indications use Option 1 or Option 2. Option 1: when the default relationship is used, if an indication is received, the UE decides whether to use Option 1 or Option 2 according to the indication. Option 2: when the default relationship is used, if an indication is received, the UE decides whether to use Option 1 or Option 2 according to the indication. Option 1 is for the default relationship, and Option 2 is used if an indication is received. In another embodiment, Option 2 is used when the default relationship is used, and Option 1 is used if an indication is received. The above indication can be RRC, MAC CE, or DCI.

Embodiment 5: The UE determines the configuration of the TCI state or a TCI state group and their correspondence with the codepoint. When the UE receives the TCI field indication in the DCI, the UE determines the TCI state information corresponding to the current transmission. If the TCI state information corresponds to the two TCI states, it is required to determine which TCI state the DMRS port indicated by the DCI belongs to. Because the ports in one CDM group cannot correspond to two TCI states, the DMRS ports indicated by the DCI belong to 2 or 3 CDM groups. This embodiment considers three CDM groups (0, 1, 2), which are only applicable to Type 2 DMRS (because Type 1 DMRS has only 2 CDM groups). If a CDM group corresponds to a TCI state, the DMRS ports belonging to the CDM group correspond to the TCI state. The CDM group 0 and the CDM group 1 are fixedly mapped to the same TCI state, and the CDM group A is selected and promoted. Then, the correspondence between the CDM group A and the CDM group 2 and the two TCI states can be according to the embodiment 3, the embodiment 3-1, the embodiment 4, the embodiment 4-1, wherein A=min (0, 1) or A=max (0, 1). For Type 2 DMRS, if DCI indicates DMRS ports 0, 1, 2, 3 and 4, then ports 0 and 1 belong to CDM group 1, ports 2 and 3 belong to CDM group 1, port 4 belongs to CDM group 2, then ports 0 1, 2, and 3 correspond to one TCI state, and port 4 corresponds to another TCI state.

Embodiment 6: The UE determines the configuration of the TCI state or TCI state group and their correspondence with the codepoint. When the UE receives the TCI field indication in the DCI, it determines the TCI state information corresponding to the current transmission. If the TCI state information corresponds to the two TCI states, it is required to determine which TCI state the DMRS ports indicated by the DCI belong to. Because the ports in one CDM group cannot correspond to two TCI states, the DMRS ports indicated by the DCI belong to 2 or 3 CDM groups. This embodiment considers three CDM groups (0, 1, 2), which are only applicable to Type 2 DMRS (because Type 1 DMRS has only 2 CDM groups). If a CDM group corresponds to a TCI state, the DMRS ports belonging to the CDM group correspond to the TCI state. The CDM group 0 and the CDM group 2 are fixedly mapped to the same TCI state, and the CDM group A is selected and promoted. Then, the correspondence between the CDM group A and the CDM group 1 and the two TCI states can be according to the embodiment 3, the embodiment 3-1, the embodiment 4, the embodiment 4-1, wherein A=min (0, 2) or A=max (0, 2). For Type 2 DMRS, if DCI indicates DMRS ports 0, 1, 2, 3 and 4, then ports 0 and 1 belong to CDM group 1, ports 2 and 3 belong to CDM group 1, port 4 belongs to CDM group 2, then ports 0 1, and 4 correspond to one TCI state, and ports 2 and 3 correspond to another TCI state.

Embodiment 7: The UE determines the configuration of the TCI state or TCI state group and their correspondence with the codepoint. When the UE receives the TCI field indication in the DCI, the UE determines the TCI state information corresponding to the current transmission. If the TCI state information corresponds to the two TCI states, it is required to determine which TCI state the DMRS ports indicated by the DCI belong to. Because the ports in one CDM group cannot correspond to two TCI states, the DMRS ports indicated by the DCI belong to 2 or 3 CDM groups. This embodiment considers three CDM groups (0, 1, 2), which are only applicable to Type 2 DMRS (because Type 1 DMRS has only 2 CDM groups). If a CDM group corresponds to a TCI state, the DMRS ports belonging to the CDM group correspond to the TCI state. The CDM group 1 and the CDM group 2 are fixed to the same TCI state, and the CDM group A is selected and promoted. Then, the correspondence between the CDM group A and the CDM group 1 and the two TCI states can be according to the embodiment 3, the embodiment 3-1, the embodiment 4, and the embodiment 4-1, wherein A=min (1, 2) or A=max (1, 2). For Type 2 DMRS, if DCI indicates DMRS ports 0, 1, 2, 3 and 4, then ports 0 and 1 belong to CDM group 1, ports 2 and 3 belong to CDM group 1, port 4 belongs to CDM group 2, then ports 0 and 1 correspond to one TCI state, and ports 2, 3, and 4 correspond to another TCI state.

In summary, some embodiments are for a case where the PDSCH indicates the two TCI states in one transmission. Some embodiments propose a corresponding scheme of a DMRS port (a CDM group group) and the TCI states, a corresponding configuration, and an indication scheme. In some embodiments, a downlink data transmission is scheduled for one physical downlink control channel (PDCCH), and the downlink data is transmitted from multiple transmission/reception points (TRPs), panels, and/or beams simultaneously, and a correspondence between a codepoint and at least one TCI state indicated by the DCI and a correspondence between two TCI states and a CDM group are provided. Features of the embodiment are as follows. 1. A correspondence between a codepoint and at least one TCI state indicated by the DCI is provided. a) An information element (IE) of a current TCI state is extended, a current MAC CE signaling to indicate the TCI state is reused. b) An IE of a new TCI state group is defined, a MAC CE signaling to indicate the TCI state is used, and a switching relationship with a current MAC CE signaling is provided. c) A current RRC configured TCI state is used, a fixed field for each codepoint in the MAC CE to indicate a corresponding TCI state is used. d) A current RRC configured TCI state is used, and a variable domain for each codepoint in the MAC CE to indicate the corresponding TCI state is used. A partial bit indication in the same byte as a TCI state indication field is used. Extra bits refer to a configuration of different codepoints. e) The MAC CE displays a configuration codepoint information, a corresponding configuration indication, and a corresponding TCI state information. 2. A correspondence between two TCI states and CDM groups is provided. a) A network configuration correspondence is provided. b) A correspondence between the two CDM groups and the two TCI states is determined according to the TCI state ID size. c) A correspondence between the two CDM groups and the two TCI states is determined according to the positions in a configuration signaling according to the TCI states. d) Based on the above, an expansion plan for 3 CDM groups is provided.

Figure 4:
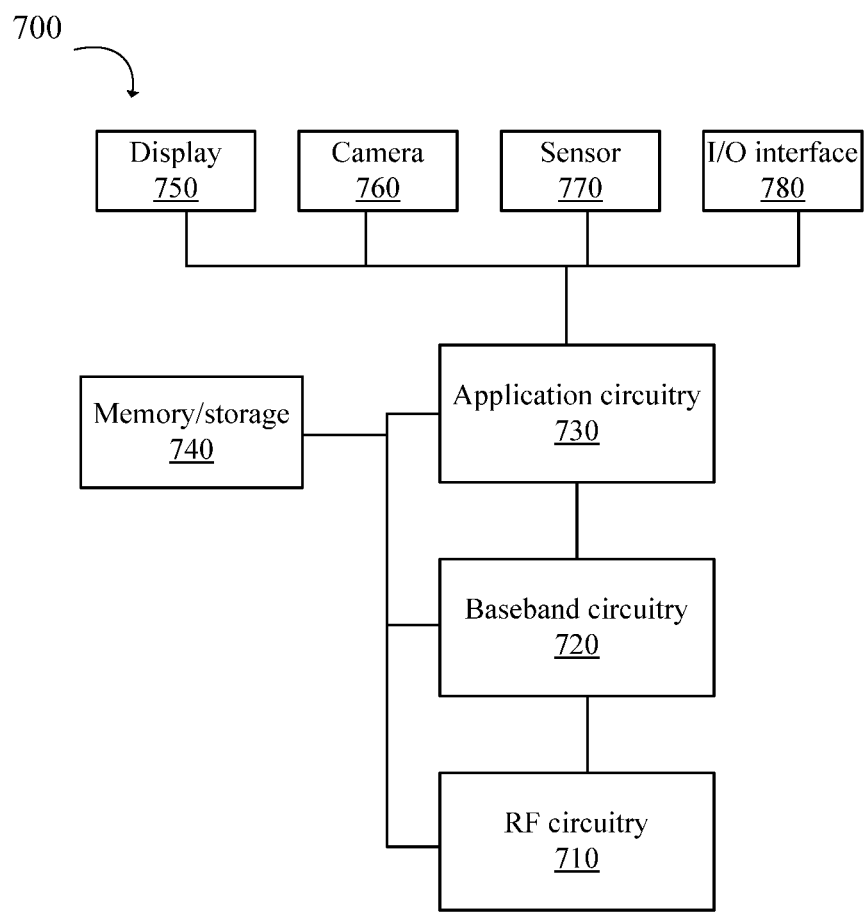
FIG. 4 is a block diagram of a system for wireless communication according to an embodiment of the present disclosure.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, an apparatus and a method of determining a transmission configuration indication (TCI) capable of providing a good signaling flexibility, a fast configuration, a good communication performance, and/or high reliability for a user equipment (UE) are provided. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

It is understood that the present disclosure is not limited to the disclosed embodiments but is intended to cover various arrangements made without departing from the scope of the broadest interpretation of the appended claims.

What is claimed is:

1. A user equipment (UE) of determining a transmission configuration indication (TCI), comprising:
   a memory;
   a transceiver; and
   a processor coupled to the memory and the transceiver, wherein the processor is configured to:
      control the transceiver to receive downlink control information (DCI) from a network node; and
      determine one or more corresponding TCI states according to an indication of the DCI or an indication of a medium access control (MAC) control element (CE),
   wherein the processor is further configured to determine the one or more corresponding TCI states according to a codepoint value of a TCI field in the DCI,
   wherein a correspondence between one or more CDM groups and TCI states is indicated by a radio resource control (RRC) signaling or a MAC CE, or is preconfigured, wherein the correspondence between the one or more CDM groups and the TCI states is pre-configured, when the DMRS ports indicated by the DCI belong to two CDM groups, both a type 1 DMRS and a type 2 DMRS are applicable, and wherein when the DMRS ports indicated by the DCI belong to the two CDM groups, the correspondence between the one or more CDM groups and the TCI states is determined according to positions of the TCI states in a configuration signaling, wherein a CDM group with a small CDM group number of the two CMD groups corresponds to a TCI state of a front position, and a CDM group with a large CDM group number of the two CMD groups corresponds to a TCI state of a back position, or the CDM group with the large CDM group number of the two CMD groups corresponds to the TCI state of the front position, and the CDM group with the small CDM group number of the two CMD groups corresponds to the TCI state of the back position.

2. The UE of claim 1, wherein the indication is indicated by a TCI field of the DCI.

3. The UE of claim 1, wherein a length of the TCI field is 3 bits, 4 bits, or a configured bit determined according to a configuration from the network node.

4. The UE of claim 1, wherein the transceiver receives TCI state configuration information from the network node before receiving the DCI.

5. The UE of claim 4, wherein the TCI state configuration information comprises a plurality of TCI states configured by the network node or a plurality of TCI state groups configured by the network node.

6. The UE of claim 5, wherein the TCI state configuration information is transmitted by the network node using a radio resource control (RRC) signaling.

7. The UE of claim 5, wherein each of the TCI state groups indicates 1 to N TCI states.

8. The UE of claim 7, wherein N is equal to 2.

9. The UE of claim 7, wherein the 1 to N TCI states are configured according to a 3rd generation partnership project (3GPP) new radio (NR) release 15.

10. The UE of claim 5, wherein the transceiver is configured to receive configuration information indicating a correspondence between a codepoint of the TCI field and the TCI states or a correspondence between the codepoint of the TCI field and the TCI state groups from the network node.

11. The UE of claim 10, wherein the configuration information indicating the correspondence between the codepoint of the TCI field and the TCI states or the correspondence between the codepoint of the TCI field and the TCI state groups is configured by the network node using a medium access control (MAC) control element (CE).

12. A method for determining a transmission configuration indication (TCI) of a user equipment (UE), comprising:
receiving downlink control information (DCI) from a network node; and determining one or more corresponding TCI states according to an indication of the DCI or an indication of a medium access control (MAC) control element (CE), wherein the method further comprises: determining the one or more corresponding TCI states according to a codepoint value of a TCI field in the DCI, wherein a correspondence between one or more CDM groups and TCI states is indicated by a radio resource control (RRC) signaling or a MAC CE, or is pre-configured, wherein the correspondence between the one or more CDM groups and the TCI states is pre-configured, when the DMRS ports indicated by the DCI belong to two CDM groups, both a type 1 DMRS and a type 2 DMRS are applicable, and wherein when the DMRS ports indicated by the DCI belong to the two CDM groups, the correspondence between the one or more CDM groups and the TCI states is determined according to positions of the TCI states in a configuration signaling, wherein a CDM group with a small CDM group number of the two CMD groups corresponds to a TCI state of a front position, and a CDM group with a large CDM group number of the two CMD groups corresponds to a TCI state of a back position, or the CDM group with the large CDM group number of the two CMD groups corresponds to the TCI state of the front position, and the CDM group with the small CDM group number of the two CMD groups corresponds to the TCI state of the back position.

13. The method of claim 12, wherein the indication is indicated by a TCI field of the DCI.

14. The method of claim 12, wherein if one corresponding TCI state is determined, all demodulation reference signal (DMRS) ports indicated by the DCI correspond to the one corresponding TCI state.

15. The method of claim 14, wherein if two corresponding TCI states are determined and one or more CDM groups correspond to the two TCI states, all DMRS ports indicated by the DCI belonging to the one or more CDM groups correspond to the two corresponding TCI states.

16. The method of claim 12, wherein a length of the TCI field is 3 bits, 4 bits, or a configured bit determined according to a configuration from the network node.

17. The method of claim 12, wherein the transceiver receives TCI state configuration information from the network node before receiving the DCI.

18. The method of claim 17, wherein the TCI state configuration information comprises a plurality of TCI states configured by the network node or a plurality of TCI state groups configured by the network node.

19. The method of claim 18, wherein the TCI state configuration information is transmitted by the network node using a radio resource control (RRC) signaling.

* * * * *